Patented Feb. 2, 1943

2,309,884

UNITED STATES PATENT OFFICE 2,309,884

PROCESSING OF FOODS

Harry Bresnick, New York, N. Y.

No Drawing. Application May 2, 1940,
Serial No. 333,032

7 Claims. (Cl. 99—15)

This invention relates to improved processes of processing foods and substances that enter the digestive tract, and the improved products resulting therefrom.

It is the object of the present invention to provide novel processes of treating and preparing foods containing phosphatides and analogous compositions subject to decomposition by heat, as incidental to roasting and other food treating processes.

The present invention proceeds upon the principle that when fatty food products containing phosphatides are subjected to heat, as by roasting, the phosphatides break down into decomposition products which occasion difficulties in digestion when they are eaten. For example, when such foods as chocolate, cocoa, coffee, or peanut butter, which contain phosphatides are subjected to a heating operation, these phosphatides break down, and when eaten cause gastric distress for many people, and regurgitation almost universally. It is my theory that this is caused by the decomposition of the phosphatides during roasting, which apparently start breaking down around 145° F., particularly in products containing a small percentage of moisture. Whereas these phosphatides, for example in peanuts, when unroasted, digest readily, and with no gastric disturbance, once roasting takes place regurgitation is immediately observed upon eating these roasted nuts.

Likewise in the case of chocolate, roasted coffee, or cocoa powder, the phosphatides are broken down during the roasting of the beans, or at any other stage of processing which may be executed at elevated temperatures.

The invention comprehends the extraction of the phosphatides preferably before roasting of the food products containing them, by the usual processes, as are known in the prior art, for example, the solvent process for the extraction of commercial lecithin and other phosphatides from soy bean flour, or other sources. The food product is then roasted or processed as usual, whereupon the extracted phosphatides may then be introduced subsequent to the roasting and cooling for their preservative and other desirable properties. The invention comprehends the reintroduction of the extracted phosphatides of like or different amounts derived from the same source, or the introduction of phosphatides from other sources. The additional sources of the phosphatides may be of vegetable or animal origin.

Although a small amount of commercial phosphatides, usually from the soy bean through extraction, is sometimes added to chocolate subsequent to roasting for the purpose of controlling viscosity, the finished product contains as well the original phosphatides which have been broken down during roasting, and which possess undesirable digestive characteristics, as pointed out above.

My invention is capable of general dietetic and therapeutic application. For example, in the medical field of allergies, physicians now generally exclude chocolate products. It is my belief that the factor causing skin eruptions and discolorations may be due to the decomposition phosphatide products in the chocolate. The elimination of such decomposition phosphatides from all manufactured or natural products, which through cooking or processing undergo a decomposition of the phosphatides contained therein, marks an advanced step in the field of treatment of allergies, which are acknowledged by physicians to be caused by proteins, in which broad class the phosphatides fall as a protein hybrid.

The invention is capable of general application, and may be applied to all foods or products which contain phosphatides, and which are subjected to a heating operation which operates to decompose the phosphatide compositions. If desired, the decomposed phosphatides may be extracted following the heating operation and undecomposed phosphatides may be substituted in their stead, or else the product may be used free of any phosphatide factors.

The invention may be applied to tobaccos, both chewing and smoking tobaccos, especially cigarettes. When lit, the phosphatides may become decomposed, and moving in the smoke inhaled, are absorbed, at least partially by the stomach.

I claim:

1. The method of processing a solid, fatty alimentary product containing a phosphatide constituent and subjected to a roasting operation which normally decomposes the phosphatide constituent with consequent deleterious results, which comprises extracting the phosphatide constituent prior to the roasting operation, and roasting the alimentary product to attain the desired state.

2. The method of processing a solid, fatty alimentary product containing a phosphatide constituent and subjected to a roasting operation which normally decomposes the phosphatide constituent with consequent deleterious results, which comprises extracting the phosphatide constituent prior to the roasting operation, roasting the solid fatty alimentary product to attain the desired state, and adding phosphatide in an undecomposed state to the treated solid fatty alimentary product.

3. The method of treating solid fatty alimentary products with a small moisture content and containing phosphatides and which normally are subjected to a roasting operation during which the phosphatides are decomposed, which comprises eliminating said phosphatide factors therefrom, and subsequently incorporating a phosphatide in an undecomposed state to the solid roasted fatty products.

4. The method of treating a solid fatty product containing a phosphatide constituent subject to decomposition upon heating, which comprises roasting the product at some stage of the preparation thereof for utilization and extracting the phosphatide constituent.

5. The method of treating nut and nut paste products containing phosphatides subject to decomposition upon heating, which comprises roasting the products at some stage of the preparation thereof for utilization and extracting the phosphatides.

6. The method of treating chocolate and cocoa products containing phosphatides subject to decomposition upon heating, which comprises roasting the products at some stage of the preparation thereof for utilization and extracting the phosphatides.

7. The method of treating tobacco products containing phosphatides subject to decomposition upon heating, which comprises roasting the products at some stage of the preparation thereof for utilization and extracting the phosphatides.

HARRY BRESNICK.